Patented Mar. 24, 1953

2,632,744

UNITED STATES PATENT OFFICE 2,632,744

PREPARATION OF POLYMERIZED POLYESTER RESIN MATERIALS OF IMPROVED STRENGTH AND WATER RESISTANCE

Arthur M. Howald, Toledo, Ohio, assignor to Libbey-Owens-Ford Glass Company, Toledo, Ohio, a corporation of Ohio No Drawing. Application January 31, 1947, Serial No. 725,718

10 Claims. (Cl. 260—17.3)

The invention relates to the preparation of materials of improved strength and water resistance comprising cellulose and a polymerized unsaturated polyester.

A polymerizable unsaturated polyester is highly advantageous as a starting material for the production of hardened synthetic resins in that it is resinous in character before polymerization, and is fusible at a temperature at which polymerization is not rapid. Other heat hardenable compositions, such as urea-formaldehyde and phenol-formaldehyde compositions, are much more difficult to fabricate because they do not exist as plastic resins at temperatures much below their hardening temperatures. A heat hardenable composition can be shaped only while it is in a fused condition, and the failure of other hardenable compositions to reach a fused state below their hardening temperatures is a great handicap in fabricating operations. By the time a hardenable urea-formaldehyde or phenol-formaldehyde product has reached a fused state in a fabricating operation, its hardening already has begun, so that the hardening interferes with the shaping or molding of the composition.

Still other heat hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable polyester is resinous because it is a polymer. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat hardenable polyester, such as glycerol phthalate, is hardened by esterification with elimination of water. A polyester that hardens by esterification cannot be employed to make a molded article or other solid body because it is too difficult to remove water from the interior of such a solid body in order to complete the hardening. Even urea-formaldehyde and phenol-formaldehyde products tend to give off small amounts of volatiles as they are hardened in a mold. A polymerizable unsaturated polyester hardens by polymerization without evolution of volatiles.

Among the most useful articles produced from synthetic resins are those in which cellulose is present, usually in the form of a filler or in the form of laminated sheets. The present invention relates to the production of articles containing cellulose and a polymerized unsaturated polyester.

The principal object of the invention is the production of a novel material comprising cellulose and a polymerized unsaturated polyester in which the cellulose is modified so that the material has greatly improved strength and water resistance. More specific objects and advantages are apparent from the description which merely discloses and illustrates the invention and is not intended to impose limitations upon the claims.

A material embodying the invention, which upon polymerization has improved strength and water resistance, comprises a polymerizable unsaturated polyhydric alcohol-polycarboxylic acid polyester and a material consisting substantially of cellulose, impregnated with a substantially infusible reaction product of formaldehyde and a substance whose molecule has a plurality of $NH_2$ groups each connected to a carbon atom which in turn is connected by a double bond to an atom selected from the class consisting of nitrogen and oxygen, i. e., an atom of an element whose atomic weight is from 14 to 16.

The infusible reaction product with which the cellulose is impregnated produces a marked improvement in the properties of the material obtained upon polymerization of the polyester. It is believed that the infusible reaction product forms a good bond between the polymerized polyester and the cellulose, so as to increase the strength of the material and to prevent moisture from creeping between the polymeriztd polyester and the cellulose. An important advantage of the presence of the infusible reaction product is that it prevents the strength of the finished material from decreasing appreciably upon soaking of the material in water.

In a material embodying the invention, the cellulose impregnated with the infusible reaction product functions as an inert component, and the polymerizable polyester functions as a thermosetting binder for the impregnated cellulose.

The essence of the present invention is the use of the infusible reaction product as part of the inert component or filler, in combination with the polyester. It was not known heretofore that the combination of a polymerizable polyester with cellulose could be improved by the addition of any other inert substance to the cellulose, and the present invention is based upon the discovery that an important improvement is produced by the use of the infusible reaction product hereinbefore described as part of the inert component or filler with which the polymerizable polyester is used as a thermosetting binder.

A molding composition embodying the invention comprising a polymerizable polyester, and cellulose impregnated with an infusible reaction product hereinbefore described, such as a urea-formaldehyde reaction product, is quite different from a molding composition in which such reaction product is still fusible and therefore constitutes part of the thermosetting binder rather than part of the inert filler. In the latter composition the thermosetting binder is made up of both the polymerizable polyester and the thermosetting urea-formaldehyde reaction product. The latter composition is highly unsatisfactory because the thermosetting polyester and the thermosetting urea-formaldehyde reaction product do not set at the same time. At ordinary temperatures, such a composition soon becomes so stiff as to be worthless for molding, because the polyester is acid and its acidity causes the urea-formaldehyde reaction product to set to an infusible resin which rigidifies the composition even though the polyester remains fusible. At molding temperatures the polyester sets much faster than the urea-formaldehyde reaction product. Thus in a hot-molding operation such a composition is too stiff at first because the urea-formaldehyde reaction product has not yet fused. By the time the urea-formaldehyde reaction product has fused, the polyester already has set to rigidify the composition. A molding composition embodying the invention gives entirely different results, by reason of the fact that the reaction product with which the cellulose is impregnated is in an infusible state. The infusible reaction product functions as a part of the inert filler to give the novel and advantageous results hereinbefore described.

The material consisting substantially of cellulose that is used in the practice of the invention may be any one of a number of well-known materials such as alpha cellulose, wood flour, wood pulp, sawdust, wood shavings, walnut shell flour, chopped newspapers or ground corn cobs. In a molding composition embodying the invention the cellulosic material may be finely divided or it may include relatively large pieces of chopped cotton cloth to give maximum impact strength.

When the present invention is used to produce a sheet of paper coated with a polyester, the impregnated cellulosic material is in the form of a single sheet. Sheets of cellulosic cloth or paper impregnated with the substantially infusible reaction product may be bonded into a laminate by a polymerized polyester resin.

Under the proper conditions, impregnation of the cellulosic material with one of the reaction products hereinbefore described may be achieved by mixing the cellulosic material with a solution of a soluble form of the reaction product in a polymerizable polyester. However, it has been found preferable to employ an aqueous solution of the reaction product for impregnating the cellulosic material. The cellulosic material can be mixed with an emulsion of the polyester in an aqueous solution of the reaction product. In any case the cellulosic material cannot be impregnated with the polyester before it is impregnated with the reaction product, because previous impregnation with the polyester would prevent the cellulosic material from being impregnated with the reaction product.

The preferred procedure is to impregnate the cellulosic material with a solution of a reaction product of formaldehyde and one of the substances hereinbefore described before the cellulosic material is incorporated with the polyester.

Ordinarily it is preferable also to convert the reaction product substantially to its infusible state before the impregnated cellulosic material is mixed with the polyester. If a cellulosic filler impregnated with a fusible reaction product of the type hereinbefore described is mixed with a polymerizable polyester, the acidity of the polyester thereafter causes the reaction product to be converted into its infusible state. The infusible reaction products thus produced is in the form of a molecular network that extends throughout the composition and may render the whole composition quite stiff and infusible. In order to obtain a moldable material, it then may be necessary to grind up the composition or otherwise rework it to break down the molecular network formed by the infusible reaction product.

In the production of laminates or single sheets of impregnated paper in accordance with the invention, it may not be necessary to convert the reaction product to its infusible state before the sheets are incorporated with the polyester, and the conversion of the reaction product to its infusible state may take place simultaneously with the polymerization of the polyester.

In the practice of the invention, the cellulosic material may be impregnated with a reaction product of formaldehyde and a substance whose molecule has a plurality of NH₂ groups each connected to a carbon atom which in turn is connected by a double bond to an atom selected from the class consisting of nitrogen and oxygen, e. g. urea; a guanazole such as guanazole,

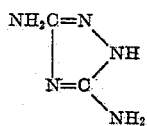

or 1-carbamyl guanazole,

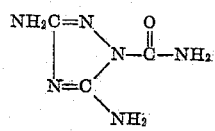

a diurea such as ethylene diurea,

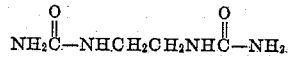

or propylene diurea,

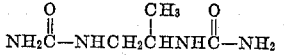

a dicarbamate such as diethylene glycol dicarbamate,

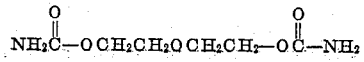

a pyrimidine such as 2,4-diamino-6-hydroxy pyrimidine,

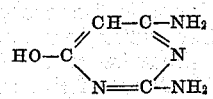

or a quinazoline such as 2,4-diaminoquinazoline,

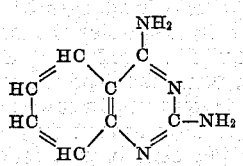

Exceptionally good results are obtained when the substance reacted with formaldehyde is one whose molecule has a plurality of NH₂ groups each attached to a triazine ring, e. g. melamine; a guanamine such as formoguanamine,

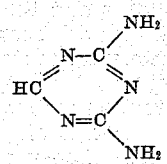

aceto guanamine,

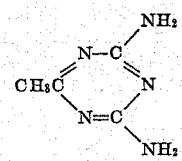

or benzoguanamine,

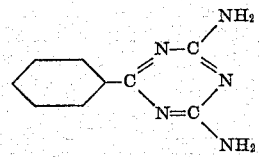

or a diguanamine such as adipoguanamine,

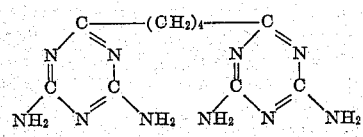

or sebacoguanamine,

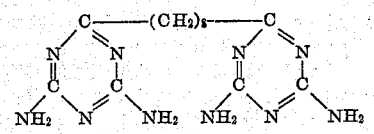

The substance whose reaction product with formaldehyde is employed preferably has a molecule containing no atoms other than carbon, nitrogen, hydrogen and oxygen.

In the preparation of a reaction product for use in the practice of the invention, one of the substances hereinbefore described, for example, melamine or urea, or a mixture thereof, may be reacted either with formaldehyde or with a polymer thereof, such as paraformaldehyde. Preferably, the substance is reacted with a solution of formaldehyde in water, in an organic solvent such as an alcohol, or in a liquid containing both water and an organic solvent. If an alcoholic solvent such as methyl, ethyl, propyl or butyl alcohol is employed, a solution of an intermediate "alkylated" reaction product may be obtained that is soluble in a polyester. The reaction may be performed in an autoclave, if desired, to secure a reaction temperature above the boiling point of the solvent. When an aqueous formaldehyde solution is used for the reaction, the solution preferably is about neutral at the start of the reaction. Since a commercial aqueous formaldehyde solution is strongly acid, a base preferably is added to bring the initial pH of the reaction solution to the desired value. Any desired base may be employed. The preferred proportions are about 3 mols of formaldehyde for every 2 mols of urea and about 3 mols of formaldehyde for each mol of melamine. The maximum amount of formaldehyde that will react is approximately 2 mols for each mol of urea and approximately 6 mols for each mol of melamine, but an excess of formaldehyde above these maxima, or any smaller proportion ranging down to one mol of formaldehyde for each mol of urea or melamine, may be used for the reaction if desired. Because of the complexity of the molecules of the reaction products that are produced, the proportion of formaldehyde actually reacting with the melamine or urea may vary freely between the limits stated.

Any other of the aforementioned substances, or mixtures thereof, may be reacted with formaldehyde in substantially the same manner to produce reaction products for use in the practice of the invention.

Examples of molal ratios of formaldehyde to such substances in the reaction products are 2:1 for guanazole or 1-carbamyl guanazole, 2:1 for ethylene diurea or propylene diurea, 2.5:1 for diethylene glycol dicarbamate, 4:1 for 2,4-diamino-6-hydroxy pyrimidine, 3:1 for 2,4-diamino quinazoline, 2:1 for formoguanamine, acetoguanamine or benzoguanamine and 5:1 for adipoguanamine or sebacoguanamine.

The reaction proceeds at normal temperatures, but heating ordinarily is desirable to shorten the time of reaction or, in some cases, to dissolve the substance to be reacted with formaldehyde. A solution for impregnating the cellulosic material may be prepared by carrying the reaction only to its earliest stage, for example, the stage at which the reacting ingredients have just dissolved to form a solution, or by carrying the reaction to any further stage (short of the insoluble stage).

By advancing the reaction, it is possible to obtain intermediate reaction products that are insoluble but still fusible. Intermediate reaction products so prepared can be milled with the cellulosic material on a heated two-roll (differential speed) rubber mill in order to impregnate the cellulosic material thoroughly before conversion of the reaction products to a substantially infusible resin.

However, for the purposes of the invention it is convenient to employ the soluble types of intermediate reaction products. In the preparation of a filler for a molding composition embodying the invention the cellulosic material may be impregnated with an aqueous solution of the reaction product and then dried. The dried impregnated cellulosic material may be ground to a fine powder, in a ball mill, for example, in order to produce a homogeneous composition. An acid substance may be incorporated during the grinding stage. The fine powder so obtained may be baked to convert the reaction product to a substantially infusible form.

Molding scrap or waste which consists essentially of cellulosic material impregnated with an infusible reaction product of the class described may be ground and used in the preparation of a molding compound of the instant invention. Such waste material is very dense and therefore must be ground to a fine powder before it can be used as a filler, although it is difficult to grind.

In the preferred method of preparing a filler for a molding composition embodying the invention, the cellulosic material is impregnated, in a shredder, for example, with an aqueous solution of the reaction product, an acid substance is incorporated, and then the material is dried. The dried impregnated cellulosic material thus produced is relatively brittle and need not be ground before incorporation with the polyester binder. However, it may be desirable to grind the material, in a ball mill, for example, in order to incorporate a polymerization catalyst for the polyester binder or to produce a more homogeneous final molded product.

Another aspect of the invention is based upon the discovery that the moisture resistance of finished molded articles embodying the invention is noticeably superior if the impregnated cellulosic material is not ground after the reaction product has been converted to the infusible state. Therefore the omission of grinding is generally preferred. Although the reason for this phenomenon is not completely understood, it is believed that one of the functions of the reaction product is to form a hard impenetrable casing around the cellulose particles, and that grinding to some extent cracks or loosens this casing.

The proportion of the infusible reaction product to the cellulosic filler may range from a very small proportion such as about 1 part of reaction product to 20 parts of cellulosic filler to a very high proportion such as 10 parts of reaction product to about 1 part of cellulosic filler. (The terms "parts" and "per cent," as used herein to refer to quantities of material, mean parts and per cent by weight.) The preferred ranges depend upon the particular reaction product employed. For example, the range for the per cent of melamine-formaldehyde reaction product in the dried, impregnated cellulosic filler in which the beneficial effects of the invention are particularly apparent may be from about 30 to about 60 per cent, and the optimum per cent at which the best all-around combination of properties is obtained for the amount of the reaction product used, may be about 40. On the other hand, in the case of a urea-formaldehyde reaction product, the preferred range may be from about 50 to about 80 per cent and the best results may be obtained at about 65 per cent.

In the preferred method of preparing impregnated cellulosic sheets for use in a laminate embodying the invention, a cellulosic cloth or paper is dipped in an aqueous solution of the reaction product and then dried, preferably at an elevated temperature in order to convert the reaction product to a substantially infusible state. As a practical matter in an industrial application, pulp in a paper machine may be pretreated by the manufacturer so as to produce paper sheets already impregnated with a substantially infusible reaction product. Other methods of impregnating cellulosic laminating materials, such as spraying or brushing an aqueous or organic solvent solution of the intermediate reaction product onto the material, may also be employed.

The proportion of the infusible reaction product to the cellulosic laminating material may range form as low as about 1 part to 200, at which some of the benefits of the invention may be obtained without appreciably affecting the original flexibility of the laminating material, to as much as about one part of reaction product to each part of filler, which is about as much reaction product as may be used while still retaining the general characteristics of the cloth or paper in the laminating material. Small amounts of reaction products produce a more noticeable beneficial effect in laminates than corresponding amounts in molded products. The preferred ranges depend upon the type of laminating material used. For example, in the case of laminating paper the preferred range may be from about 2 to about 20 per cent of the reaction product in the dried, impregnated paper, and about 10 per cent may be the optimum at which the best all-around results are obtained. On the other hand, in the case of cellulosic cloth, such as muslin, the preferred range may be from about 5 to about 35 per cent and the best all-around results may be obtained at about 25 per cent.

The polymerizable unsaturated polyhydric alcohol-polycarboxylic acid polyester used in the practice of the invention is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity. Ordinarily it is desirable that the unsaturated polyester be polymerizable into an infusible or high melting point resin, so that the proportion of unsaturated components should be such that the polyester contains an average of more than one double bond per molecule; for example, there may be an average of eleven or more double bonds in every ten molecules of the polyester.

The present invention is equally applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3 or a mono-alkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expediate the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect. Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As a further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

Polymerization of these materials usually is carried out at temperatures of about 160° to about 180° F. A solution comprising one or more polymerizable unsaturated polyesters and one or more polymerizable monomeric compounds is particularly useful as a binder. Either the unsaturated polyester or the monomeric compound or both may be partially polymerized before the ingredients are mixed. Polymerizable monomeric compounds that are useful for the preparation of such a solution include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

Such a solution, which usually contains about 20 to 30 per cent of the polymerizable monomeric compound and about 70 to 80 per cent of the polymerizable polyester, is particularly advantageous because the polyester has desirable physical properties and hardens very rapidly whereas the presence of the monomeric compound causes the polymerized product to be much more water resistant and insoluble. Moreover, the combination of the polyester and the monomeric compound usually polymerizes more rapidly than either of such substances alone.

A similar solution may be prepared by dissolving the polyester, before use, in a polymerizable substance such as styrene, vinyl acetate, methylmethacrylate or methylacrylate.

In the production of a molding compound embodying the invention the mixing of the dried impregnated cellulosic filler with the polymerizable polyester may be carried out by any of the known methods. If the polyester is very viscous, it may be necessary to incorporate the cellulosic filler in the polyester on a heated two-roll (differential speed) rubber mill or it may be desirable to heat the polyester in order to reduce the viscosity sufficiently to permit the use of other mixing procedures. Ordinarily the viscosity of the polyester is such that kneading or equivalent mixing procedures may be used satisfactorily. In some cases it may be desirable to dilute the polyester with a solvent in order to facilitate mixing with the cellulosic filler.

The proportion of the impregnated cellulosic filler in a molding composition embodying the invention may range from a very small proportion such as about 1 per cent to a very high proportion such as about 80 per cent. The compositions containing very small amounts of cellulosic filler are usually special compositions in which a mixed filler of cellulosic material and another material is employed. It may be desirable to use a mixed filler of cellulosic material and another material in a cold molding composition, for example, in which the per cent total filler in the composition may be as high as 90 per cent. Generally speaking, the preferred range is from about 40 to about 75 per cent of impregnated cellulosic filler in the molding composition, and the best all-around results are obtained at about 55 to 60 per cent.

Casting and adhesive compositions embodying the invention, of course, may contain as little as 1 per cent of impregnated cellulosic filler, and the maximum per cent of filler in such compositions is simply that amount which may be added to the polyester without rendering the compositions too stiff. For example, in adhesive compositions the proportion of the filler to the polyester may range from as low as about 1:100 to as high as about 1:4, the preferred proportions being from about 1:30 to about 1:5.

Since the polymerizable polyester is fusible and plastic at relatively low temperatures, it is possible to adjust the amounts of catalyst and inhibiting agent so that the hardening at such temperatures takes place at a reasonable rate to allow ample opportunity for shaping and molding of the composition. In this manner compositions may be produced which are fast curing, gas free and adapted to complicated moldings (e. g. clock cases).

The preferred catalyst for use in the practice of the invention is benzoyl peroxide, but any other organic peroxide such as succinyl peroxide, acetyl peroxide, peracetic acid, perbenzoic acid, toluyl peroxide, p-brombenzoyl peroxide, anisoyl peroxide, chloroacetyl peroxide or furoyl peroxide, or any organic ozonide, such as diisopropylene ozonide or diisobutylene ozonide, or a mixture of such substances, may be used as the curing catalyst.

The proportion of the curing catalyst is simply the proportion that causes the composition to polymerize at the desired rate. The proportion of curing catalyst varies with different catalysts. The proportion of curing catalyst employed to produce a given rate of hardening may vary also with variations in the nature of the polymerizable material. For example, a polyester prepared from maleic anhydride and diethylene glycol, when used in a molding composition of the invention, containing about 3 per cent of benzoyl peroxide, may be cured at approximately the same rate as a similar polyester prepared from fumaric acid and diethylene gylcol in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the cellulosic filler by grinding with the filler in a ball mill, for example, before the filler is mixed with the polyester. In some cases a fibrous filler may be mixed with a solution, in a volatile solvent, of the polymerization catalyst and dried before the filler is mixed with the polyester. When the present method is carried out in the production of a molding or casting composition, plasticizers, lubricants, pigments and other coloring matter may be incorporated if desired.

The magnitude of the improvement in the strength and water resistance of molded articles attained in the practice of the invention may be demonstrated by tests carried out as follows: A solution of 1 mol of melamine in formalin (37 per cent aqueous formaldehyde solution) containing 3 mols of formaldehyde is held at 80° C. for 10 minutes at a pH of 7. A cellulosic filler is completely impregnated by mixing it in an eggbeater type mixer with the resulting solution of a melamine-formaldehyde condensation product diluted with sufficient water so that the weight of the diluted solution is from two to three times the weight of the cellulosic filler. The impregnated filler is then thoroughly dried and the melamine-formaldehyde condensation product is converted to a substantially infusible state by heating at 180° to 190° F. for 72 hours. A polymerizable polyester is prepared by the procedure hereinbefore described from a charge consisting of 1.05 mols of monoethylene glycol, 1 mol of maleic anhydride and an amout of hydroquinone equal to 0.04 per cent of the charge. The charge is heated to 220° C. (over a period of two hours) and is held between 220° C. and 226° C. for six more hours. The resulting polyester (95 parts), which has an acid number of about 35, is cooled to 145–150° F. and is thoroughly mixed with diallyl phthalate (5 parts) and a paste of benzoyl peroxide as a catalyst (1.5 parts) and tricresyl phosphate (1.5 parts) to form a solution. The impregnated cellulosic filler, the polymerizable polyester solution and, as a lubricant, an amount of zinc stearate equal to 2 per cent of the composition are then milled for 10–12 minutes on a heated two-roll (differential speed) rubber mill at the lowest temperature at which a homogeneous mass can be obtained. The resulting composition is removed in sheets, is allowed to solidify fully while at about 80–90° F., and then is granulated in a high speed cutter to a maximum particle diameter of about ⅛ inch. The granulated composition is compression molded to produce articles of dimensions suitable for physical testing. The composition is fast curing and gives moldings free from gas.

Table 1 shows the results of strength tests of articles prepared as above described, and more specifically describes the compositions from which the articles are molded by specifying the type of cellulosic filler used (col. 1), the per cent of melamine-formaldehyde reaction product in the dried impregnated filler (col. 2), and the per cent of the impregnated filler in the composition (col. 4), and by specifying whether or not the dried impregnated filler is ground in a ball mill before mixing with the polyester (col. 3). For the sake of comparison, test data for control articles, i. e., articles in which the reaction product is omitted from the cellulosic filler, are included in Table 1.

The strength tests employed are standard tests for plastic materials and are considered to be capable of showing generally the strength characteristics that are important in industrial plastic materials of this class. A separate description of the procedure and results of each test follows:

Flexural strength (col. 5)—A small bar (½″ x ⅜″ x 5″), molded of the material to be tested for three minutes under a pressure of 5,000 lbs. per square inch in a mold heated with steam at 60 lbs. gauge pressure, is supported at its extremities and a transverse load is applied centrally. The flexural strength "S" is the extreme fiber stress in pounds per square inch at which the bar fails, calculated according to the formula $$S = \frac{3wl}{2ba^2}$$

in which $w$ is the load in pounds, $l$ is the length in inches of the bar or span between the supports, $b$ is the horizontal dimension in inches of the cross section of the bar and $a$ is the vertical dimension in inches of the cross section of the bar. From Table 1 it can be seen that the articles embodying the invention have from 45 to 80 per cent more flexural strength than the control articles.

Deflection (col. 6)—The deflection of the bar used in the flexural strength test is measured at the instant the bar fails. The elastic modulus (in flexure) may be calculated from Young's formula $$M = \frac{mgl^3}{4sa^3b}$$

in which $M$ is the modulus in pounds per square inch, $mg$ (mass times gravity) is the load in pounds, $l$ is the length in inches of the bar or span between the supports, $s$ is the deflection in inches, $a$ is the vertical dimension in inches of the cross section of the bar and $b$ is the horizontal dimension in inches of the cross section of the bar. From Table 1 it can be seen that the articles embodying the invention are capable of undergoing as much as 65 to 75 per cent greater deflection than the control articles.

Compressive strength (col. 7)—A small bar (½″ x ⅜″ x 1″) molded under the same conditions is subjected to a compressive force acting longitudinally until the bar crumbles or shatters. The compressive strength is the force F in pounds per square inch at which the bar fails, calculated according to the formula $$F = \frac{144w}{ab}$$

in which $w$ is the load in pounds and $a$ and $b$ are the dimensions in inches of the cross section of the bar. From Table 1 it can be seen that the articles embodying the invention have compressive strengths as much as 45 to 50 per cent greater than the control articles.

Impact strength (col. 8)—The test equipment employed is substantially the same as the standard "Charpy" test apparatus, and an arbitrary gauge reading is obtained which represents the energy (foot-pounds) absorbed in the impact by which the article is broken. From Table 1 it can be seen that the articles embodying the invention have impact strengths as much as 25 to 30 per cent higher than the control articles.

Barcol hardness (col. 9)—In this test and in the impact strength test the test piece is a 2-inch diameter disk molded for one minute under a pressure of 17,000 lbs. per square inch in a mold heated with steam at 75 lbs. gauge pressure. Standard "Barcol" hardness apparatus is employed and hardness is read from a dial gauge which gives hardness readings as compared to an arbitrary standard. From Table 1 it can be seen that the articles embodying the invention have as much as 25 to 40 per cent greater hardness than the control articles.

TABLE 1

| Type of Filler | Percent Cond. Product | Ground | Percent Filler in Comp. | Flexural Strength | Deflect. Strength | Compress. Strength | Impact Strength | Barcol Hardness |
|---|---|---|---|---|---|---|---|---|
| Cell. Powder | 0 | No | 60 | 7,190 | 0.072 | 23,050 | ---- | 33 |
| Do | 5 | No | 60 | 9,440 | 0.086 | 25,975 | 0.24 | 41 |
| Do | 20 | No | 60 | 12,370 | 0.108 | 33,800 | 0.37 | 40 |
| Cell. Fluff | 10 | Yes | 55 | 10,800 | 0.109 | 32,600 | 0.33 | 49 |
| Do | 20 | Yes | 55 | 12,710 | 0.128 | 35,575 | 0.31 | 47 |
| Do | 40 | Yes | 55 | 13,050 | 0.126 | 38,700 | 0.34 | 54 |
| Do | 66 | Yes | 55 | 11,700 | 0.154 | 33,350 | 0.26 | 45 |
| Do | 0 | No | 55 | 8,800 | 0.071 | 27,100 | 0.35 | 40 |
| Do | 10 | No | 55 | 12,420 | 0.108 | 31,650 | 0.34 | 47 |
| Do | 20 | No | 55 | 11,240 | 0.096 | 29,950 | 0.40 | 45 |
| Do | 40 | No | 55 | 11,870 | 0.103 | 38,725 | 0.45 | 57 |

The results given in Table 2 show the improved water resistance of articles embodying the invention as compared to control articles, i. e., articles in which the reaction product is omitted from the cellulosic filler. Water resistance varies with the amount of moisture that an article is capable of absorbing because the degree of deterioration upon exposure to moisture varies with the amount of moisture absorbed.

The test piece for determination of water absorption is the disk above described which weighs 6.5 grams. The disk is immersed in water for a given period of time, and the water absorption is measured as the gain in weight (in grams) during immersion.

In Table 2, columns 1, 2, 3 and 4 give the same information as the corresponding columns in Table 1. The water absorption is given for tests in which test pieces made from the various molding compositions are immersed in cold water for 24 hours (col. 5) or 7 days (col. 6), or in boiling water for 1 hour (col. 7).

TABLE 2

| Type of Filler | Percent Cond. Product | Ground | Percent Filler in Comp. | Abs. in Cold Water, 1 day | Abs. in Cold Water, 7 days | Abs. in Boiling Water, 1 hour |
|---|---|---|---|---|---|---|
| Cell. Powder | 0 | No | 60 | 0.28 | 0.64 | 0.28 |
| Do | 5 | No | 60 | 0.195 | 0.595 | 0.26 |
| Do | 20 | No | 60 | 0.055 | 0.25 | 0.135 |
| Cell. Fluff | 10 | Yes | 55 | 0.19 | 0.525 | 0.23 |
| Do | 20 | Yes | 55 | 0.115 | 0.36 | 0.17 |
| Do | 40 | Yes | 55 | 0.04 | 0.13 | 0.105 |
| Do | 66 | Yes | 55 | 0.03 | 0.07 | 0.07 |
| Do | 0 | No | 55 | 0.225 | 0.475 | 0.18 |
| Do | 10 | No | 55 | 0.135 | 0.39 | 0.11 |
| Do | 20 | No | 55 | 0.07 | 0.23 | 0.115 |
| Do | 40 | No | 55 | 0.03 | 0.095 | 0.085 |

From Table 2 it can be seen that the control articles in the cold water test absorb from 5 to 7 times as much water in 24 hours and from 3 to 5 times as much water in 7 days as the articles embodying the invention. In the boiling water test the control articles absorb from 2 to 3 times as much water as the articles embodying the invention.

Tables 1 and 2 show that, although grinding the impregnated cellulose after the reaction product has been converted to the substantially infusible state does not appreciably affect the strength, the omission of this step further reduces the water absorption by 25 to 35 per cent in the molded articles embodying the invention. Also, it has been discovered that increasing the per cent of allyl monomer (e. g. diallyl phthalate) in the polymerizable polyester from 5 per cent to 20 per cent reduces the water absorption by as much as 50 per cent.

Stability of the molding composition is determined by molding samples of the composition before and after aging at room temperature for a given period of time, using a standard cup mold at a temperature corresponding to 60 pounds gauge pressure of steam. The pressure required to produce the molded cup is used as a measure of the fusibility of the composition and, in general, the stability may be considered to be inversely proportional to the increase in the required pressure upon aging. The stability of the compositions embodying the invention is not appreciably different from that of the control compositions, and the results of stability tests indicate that the impregnation of the cellulosic fillers does not impair the stability of the molding compositions.

If the cellulosic filler is impregnated with a reaction product of formaldehyde and one of the substances hereinbefore described other than melamine, a noticeable improvement in strength and water resistance is also shown. Such an improvement is shown, for example, when a molding composition is prepared and tested by a procedure that is the same as the procedure just described, except that the melamine is replaced by 2 mols of urea, and the solution is held at 30° C. for 390 minutes and then is brought to a pH between 5.5 and 6.0 by addition of lactic acid. The molding composition so prepared appears to be fast curing and free from gas. The strength of pieces molded from this composition is shown in Table 3, which corresponds to Table 1, and the water absorption is shown in Table 4, which corresponds to Table 2.

From the tables it can be seen that the articles embodying the invention in which the urea-formaldehyde reaction product is used show improvements in flexural strength of as much as 50 per cent, in deflection of as much as 100 per cent, in compressive strength of as much as 40 per cent and in hardness of as much as 20 per cent as compared with the control articles. In the water absorption tests the control articles when immersed in cold water absorb 5 times as much water in 24 hours, and 3 times as much water in 7 days as the articles embodying the invention. While these data show very great improvements it is apparent that the data for the compositions containing melamine-formaldehyde impregnated fillers show even greater improvements.

In general, reaction products of formaldehyde with most of the substances hereinbefore described give results similar to those obtained with a urea-formaldehyde reaction product, but the compounds whose molecules have a plurality of $NH_2$ groups each connected to a triazine ring, such as benzoguanamine, perform more like melamine, which gives outstandingly good results in the practice of the invention. Although the reasons for such results must logically be attributed to the presence of the triazine ring, the exact function of the triazine ring is not understood, nor is the outstanding superiority of melamine-formaldehyde impregnated fillers explained by the known relatively slight superiority of melamine-formaldehyde resin over the other resins.

The improvement in strength and water resistance may be demonstrated also by testing a molding composition embodying the invention made by impregnating a filler consisting of coarsely chopped cotton cloth as hereinbefore described with a solution of a melamine-formaldehyde reaction product. The impregnated cloth is dried and cured in an oven for 4 hours at 180° F. A polymerizable polyester is prepared by the procedure hereinbefore described from a charge consisting of 1.5 mols of maleic anhydride, 1.5 mols of diethylene glycol and an amount of hydroquinone equal to 0.2 per cent of the charge. The charge is heated to a temperature of 210° C. and is held at this temperature for 6¼ hours. The resulting polyester (75 parts), which has an acid number of about 11, is cooled and is dissolved in acetone (100 parts) with diallyl phthalate (25 parts) and benzoyl peroxide (2 parts). The dried impregnated filler is incorporated with the polyester by soaking the filler (40 parts) in the acetone solution of the polyester (120 parts). The acetone is removed by drying overnight at room temperature in a circulating oven and the resulting composition (type I) is compression molded to produce articles of dimension suitable for physical testing. Also, a polymerizable polyester is prepared by the

TABLE 3

| Type of Filler | Percent Cond. Product | Ground | Percent Filler in Comp. | Flexural Strength | Deflect. Strength | Compress. Strength | Impact Strength | Barcol Hardness |
|---|---|---|---|---|---|---|---|---|
| Cell. Fluff | 10 | Yes | 55 | 10,350 | 0.097 | 29,075 | 0.32 | 40 |
| Do | 20 | Yes | 55 | 9,310 | 0.084 | 24,600 | 0.25 | |
| Do | 40 | Yes | 55 | 13,440 | 0.140 | 37,400 | 0.35 | 47 |
| Do | 65 | Yes | 55 | 9,580 | 0.113 | 28,900 | 0.23 | 48 |
| Do | 0 | No | 55 | 8,800 | 0.071 | 27,100 | 0.35 | 40 |
| Do | 20 | No | 55 | 10,080 | 0.085 | 31,600 | | |

TABLE 4

| Type of filler | Percent Cond. Product | Ground | Percent Filler in Comp. | Abs. in Cold Water, 1 day | Abs. in Cold Water, 7 days |
|---|---|---|---|---|---|
| Cell. Fluff | 10 | Yes | 55 | 0.275 | 0.64 |
| Do | 20 | Yes | 55 | 0.155 | 0.44 |
| Do | 40 | Yes | 55 | 0.08 | 0.255 |
| Do | 65 | Yes | 55 | 0.05 | 0.14 |
| Do | 0 | No | 55 | 0.225 | 0.475 |
| Do | 10 | No | 55 | 0.19 | 0.47 |
| Do | 20 | No | 55 | 0.165 | 0.505 | procedure hereinbefore described from a charge consisting of 1.05 mols of monoethylene glycol, 1 mol of maleic anhydride and an amount of hydroquinone equal to 0.04 per cent of the charge. The charge is heated to 220° C. (over a period of 2 hours) and is held between 220° and 226° C. for 6 more hours. The resulting polyester (85 parts), which has an acid number of about 35, is cooled to 145–150° F. and is thoroughly mixed with diallyl phthalate (15 parts) and a paste of benzoyl peroxide (1½ parts) and tricresyl phosphate (1½ parts) to form a solution. The impregnated cellulosic filler, the polymerizable polyester solution and, as a lubricant, an amount of zinc stearate equal to 1½ per cent of the composition are then milled on a heated two-roll (differential speed) rubber mill. The time of milling is determined by testing the molding material every minute during milling until a satisfactory material is available. The resulting composition (type II) is removed in sheets, granulated and compression molded to produce articles of dimensions suitable for physical testing. The composition is fast curing and gives moldings free from gas.

Table 5 shows the properties of articles so prepared and more specifically describes the compositions from which the articles are molded by specifying the per cent of melamine-formaldehyde condensation product in the dried impregnated cloth (line 1), the type of composition (line 2), and the length of time on the rolls in minutes if milling is used (line 3). The water absorption (in per cent by weight of the test piece) is given for tests in which test pieces made from various molding compositions are immersed in cold water for 1 day (line 4), 10 days (line 5) and 30 days (line 6).

Flexural strength and elastic modulus (in flexure) are obtained from a test piece (⅛"x 1"x 2") in the manner hereinbefore described. The flexural strengths are given for the test pieces when dry (line 7) and after being immersed in cold water for 30 days (line 8). Also, the elastic moduli are given for test pieces when dry (line 9) and after being immersed in cold water for 30 days (line 10). For the sake of comparison, test results for control pieces, i. e., pieces in which the reaction product is omitted from the cellulosic filler, are included in Table 5.

30 days are as much as 100 per cent greater than the control pieces. The general appearance of the pieces embodying the invention is noticeably superior to that of the control pieces after 10 days' immersion in water, at which time the polyester and cloth fibers show signs of separating in the control pieces.

In the production of laminates embodying the invention the coating of the dried impregnated cellulosic laminating material with the polymerizable polyester may be carried out by any of the known methods. Generally, it is preferable to dip the cellulosic laminating material in a solution of the polymerizable polyester in a volatile solvent and air dry the laminate for several hours before curing under pressure. Also, the polyester or a solution of the polyester may be brushed or sprayed onto the cellulosic laminating cloth or paper.

The proportion of the polyester binder in the laminate may range from the minimum that is capable of binding the sheets of cellulosic laminating material, for example, about 20 per cent of the laminate, to the maximum that is capable of producing by ordinary laminating procedures a product having the usual laminate characteristics, for example, about 75 per cent of the laminate. The preferred range in which the best properties are obtained is about 35 to about 65 per cent of the laminate. The particular percentages at which the best results are obtained depend to a great extent upon the type of laminating material and the specific use of the resulting product. Laminates containing about 50 per cent polyester usually have the best all-around combination of desirable properties.

The improvement in strength and water resistance may be demonstrated by testing a laminate embodying the invention made by impregnating a white laminating paper with a commercial water-soluble melamine-formaldehyde condensation product (Melamac-402), the laminating paper being cut into strips, immersed in an aqueous solution of the melamine-formaldehyde condensation product containing an amount of butanol equal to 5 per cent of the water in the solution, and then dried by exposing to the atmosphere for 24 hours. The dried impregnated strips may be coated with the polyester binder at once, i. e. "uncured," or after being heated for

TABLE 5

| Sample Number | Control #1 | Control #2 | A | B | Control #3 | C | D |
|---|---|---|---|---|---|---|---|
| (1) Percent Melamine-Formaldehyde in Dry Filler | 0 | 0 | 10 | 30 | 0 | 10 | 30 |
| (2) Type of Composition | II | II | II | II | I | I | I |
| (3) Time on Rolls (min.) | 7 | 12.5 | 5.75 | 3.5 | | | |
| (4) Water Absorption (1 day) | 2.1 | 2.4 | 1.4 | .89 | 1.63 | 1.08 | .70 |
| (5) Water Absorption (10 days) | 6.4 | 6.9 | 5.4 | 2.3 | 5.2 | 4.8 | 2.1 |
| (6) Water Absorption (30 days) | 6.6 | 7.3 | 6.2 | 3.5 | 6.6 | 5.4 | 3.3 |
| (7) Flexural Str. (dry) | 9,900 | 11,400 | 12,800 | 12,900 | 8,750 | 9,920 | 9,450 |
| (8) Flexural Str. (30 days' immersion) | 5,100 | 5,150 | 8,600 | 10,500 | | | |
| (9) Elastic Mod. (dry) ($\times 10^{-6}$) | 0.75 | 0.83 | 1.0 | 1.2 | 0.94 | 1.1 | 1.06 |
| (10) Elastic Mod. (30 days' immersion) ($\times 10^{-6}$) | 0.38 | 0.41 | 0.91 | 0.92 | | | |

From Table 5 it can be seen that the control pieces in cold water absorb up to 2½ times as much water in 1 day, up to 3 times as much water in 10 days and up to 2 times as much water in 30 days as the pieces embodying the invention. The flexural strengths of the pieces embodying the invention when dry are as much as 30 per cent greater and after immersion in water for 15 minutes at 300° F. to convert the condensation product to a substantially infusible state, i. e., "cured." The strips (cured or uncured) are dipped in a 50 per cent acetone solution of a polymerizable polyester (produced as described hereinbefore) which contains diethylene glycol-maleate (75 parts), diallyl phthalate (25 parts) and benzoyl peroxide (5 parts), and then are air dried for 24 hours. The dried strips are stacked under a pressure of 400 pounds per square inch and cured for 20 minutes at 212° F. and then for 20 minutes at 300° F. to produce laminates which show no defects and are free from gas.

Table 6 shows the properties of laminates so prepared, and more specifically describes the compositions from which the laminates are produced by specifying the per cent of the melamine-formaldehyde condensation product in the impregnating solution (col. 1), and the per cent of the melamine-formaldehyde condensation product in the dried impregnated paper (col. 2) and by specifying whether the impregnated paper is cured or uncured (col. 3). The compressive strength test for test pieces (⅛" x ½" x ¾") of the laminates is carried out in the same manner as the compressive strength test for molded articles. The compressive strength is given in pounds per square inch for laminates which are dry (col. 4), are immersed in cold water for 24 hours (col. 5) and are immersed in cold water for 10 days (col. 7). Also, the per cent decrease in compressive strength (on a dry strength basis) is given for the laminates after immersion in cold water for 24 hours (col. 6) and after immersion in cold water for 10 days (col. 8). For the sake of comparison, properties of control laminates, i. e., laminates in which the reaction product is omitted from the paper laminating material, are shown in Table 6.

pieces (⅛" x 1" x 2") of the resulting laminates are as follows:

|  | Controls | Impregnated with 10% Solution of Condensation Product |
|---|---|---|
| Flexural strength (dry) | 19,800 | 19,900 |
| Flexural strength (after immersion for 24 hours) | 17,100 | 24,200 |
| Flexural strength (after immersion for 10 days) | 11,300 | 21,800 |
| Elastic modulus (dry) | $1.24 \times 10^6$ | $1.62 \times 10^6$ |
| Elastic modulus (after immersion for 24 hours) | $.36 \times 10^6$ | $1.59 \times 10^6$ |
| Elastic modulus (after immersion for 10 days) | $.32 \times 10^6$ | $1.50 \times 10^6$ |

From these data it can be seen that, although the laminates embodying the invention are not appreciably superior in flexural strength when dry, these laminates actually have greater flexural strength and are twice as strong as the control laminates after 10 days' immersion in water. The reason for the increase in strength is not understood, although repeated tests indicate that it is real. The modulus for the laminates embodying the invention when dry is about 30 per cent greater than that of the control laminates, but after 10 days' immersion in water the laminates embodying the invention have moduli as much as 5 times as great as that of the con-

TABLE 6

| Percent Condensation Prod. in treating Solution | Percent Condensation Prod. on paper | Uncured or Cured | Compress. Strength, Dry | Compress. Strength, 1 day's immersion | Percent Decrease | Compress. Strength, 10 days' immersion | Percent Decrease |
|---|---|---|---|---|---|---|---|
| 0 | 0 |  | 20,200 | 8,900 | 46 | 6,900 | 66 |
| 1 |  | Uncured | 21,000 | 11,800 | 44 | 8,400 | 60 |
| 1 |  | Cured | 20,500 | 11,400 | 44 | 7,590 | 63 |
| 2.5 |  | Uncured | 21,600 | 15,300 | 30 | 12,400 | 43 |
| 2.5 |  | Cured | 20,200 | 12,900 | 36 | 8,790 | 57 |
| 5 | 6 | Uncured | 23,400 | 18,700 | 20 | 11,400 | 51 |
| 5 | 6 | Cured | 24,200 | 20,300 | 15 | 12,000 | 50 |
| 10 | 11 | Uncured | 31,600 | 28,500 | 10 | 22,200 | 30 |
| 10 | 11 | Cured | 28,700 | 25,700 | 10 | 18,900 | 34 |
| 20 | 20 | Uncured | 27,200 | 26,200 | 4 | 20,500 | 25 |
| 20 | 20 | Cured | 26,600 | 24,400 | 8 | 23,400 | 12 |

From Table 6 it can be seen that laminates embodying the invention increase in compressive strength (when dry) with increases in the concentration of the condensation product in the impregnating solution up to 10 per cent, at which a maximum of 55 per cent improvement over the control laminates is reached. The compressive strength of laminates embodying the invention shows a much greater improvement over the control laminates after immersion in cold water. For example, at the end of 10 days' immersion in cold water, the laminates of the invention are as much as 3.2 times as strong as the control laminates and the decrease in compressive strength of the control laminates is as much as 5½ times as great.

A procedure is carried out that is the same as that described above for the production of the paper laminates except that the dried initially impregnated strips are cured for one-half hour at 248° F. instead of 15 minutes at 300° F. The flexural strengths and elastic moduli of test trol laminates. In other words, upon 10 days' immersion in water the moduli decreased 82½ per cent in the control laminates as compared to only 7 per cent in the laminates embodying the invention. The loss in modulus indicates that the bond fails between the fiber of the paper and the polyester in the control laminates. The results of these tests show that laminates embodying the invention compare favorably with glass cloth laminates and may be used satisfactorily under extremely wet or humid conditions.

The improvement in strength and water resistance may be demonstrated also by testing laminates embodying the invention made by impregnating heavy muslin and light airplane cloth with a solution of a melamine-formaldehyde condensation product prepared as hereinbefore described. The cloth is washed with a sulfonated soap to remove the size, dried and then ironed. The washed cloth is cut into strips, soaked for 5 minutes in a 15–20 per cent aqueous solution of a melamine-formaldehyde condensation product at 100° F., removed and then air dried. The dried impregnated cloth is cured by heating at 250° F. for 10 minutes, dipped in a 50 per cent acetone solution of a polymerizable polyester produced as described hereinbefore which contains diethylene glycol-maleate (75 parts), diallyl phthalate (25 parts), and benzoyl peroxide (5 parts), air dried for 24 hours, and laminated into panels (9" x 12" x ⅛") by the procedure hereinbefore described.

Table 7 shows the properties of test specimens cut from panels so prepared, and more specifically describes the production of the laminates by specifying the type of cloth used, i. e., muslin or airplane cloth (line 1), the number of plies in the laminate (line 2), the per cent of melamine-formaldehyde condensation product in the dried impregnated cloth (line 3) and the per cent of polyester binder in the laminate (line 4). The amount of water absorbed in the water absorption test is given in per cent by weight of the test piece for pieces immersed in cold water for 3 days (line 5), 10 days (line 6) and 30 days (line 7). The compressive strength is given for test pieces which are dry (line 8), have been immersed in cold water for 10 days (line 9) and have been immersed in cold water for 30 days (line 10). The elastic moduli are given for test pieces which are dry (line 11), have been immersed in water for 30 days (line 12), and have been immersed in water for 30 days and subsequently redried (line 13).

TABLE 7

| 1. Cloth type | Muslin | Airplane | Muslin | Airplane | Muslin | Airplane |
|---|---|---|---|---|---|---|
| 2. No. Plies in laminate | 12 | 18 | 12 | 18 | 12 | 18 |
| 3. Percent Condensation Prod. in cloth | 0 | 0 | 20 | 20 | 14 | 12 |
| 4. Percent Polyester in laminate | 61 | 61 | 55 | 55 | 55 | 55 |
| 5. Water Absorption, 3 days | 2.80 | 3.00 | 1.50 | 1.11 | 2.02 | 1.23 |
| 6. Water Absorption, 10 days | 4.68 | 5.00 | 2.49 | 1.95 | 3.18 | 3.06 |
| 7. Water Absorption, 30 days | 5.85 | 5.80 | 4.07 | 3.12 | 4.80 | 3.62 |
| 8. Compressive Strength (dry) | 17,700 | 15,600 | 17,200 | 15,400 | 15,600 | 15,300 |
| 9. Compressive Strength (immersed 10 days) | 13,400 | 12,800 | 16,400 | 14,100 | 14,700 | 14,000 |
| 10. Compressive Strength (immersed 30 days) | 14,300 | 12,800 | 17,400 | 16,200 | 16,700 | 15,200 |
| 11. Elastic Mod. (dry) ($\times 10^{-5}$) | 7.1 | 11.0 | 8.15 | 12.3 | 8.3 | 9.40 |
| 12. Elastic Mod. (immersed 30 days) ($\times 10^{-5}$) | 3.8 | 5.0 | 5.95 | 6.04 | 6.55 | 6.70 |
| 13. Elastic Mod. (immersed 30 days, dried) ($\times 10^{-5}$) | 3.5 | 6.5 | 5.0 | 5.0 | 5.35 | 7.00 |

From Table 7 it can be seen that the results obtained depend to a great extent upon the type of cloth that is used in the laminate. For example, in 10 days' immersion the laminates embodying the invention absorb about 50 per cent less than control laminates, but in longer periods of time, such as 30 days, the muslin laminates of the invention absorb about 30 per cent less than the control laminates while the airplane cloth laminates of the invention absorb about 85 per cent less than the control laminates. In the compressive strength tests the laminates embodying the invention are not appreciably better than the control laminates when dry, but after 10 days' immersion in water the control laminates have decreased as much as 30 per cent while the laminates of the invention have decreased only about 5 or 10 per cent in strength. The compressive strength of the laminates embodying the invention after 30 days' immersion is in general greater than the dry strength. The elastic moduli of the laminates of the invention are about 20 per cent greater than those of the control laminates, and immersion in water reduces the moduli of the control laminates about 50 per cent in contrast to reductions as low as 20 per cent for laminates of the invention.

It is to be understood that the properties of cloth laminates are dependent to a great extent upon such factors in the cloth itself as fiber length, thread size, thread twist, fiber conditioning, surface treatment and weave. However, the effect of other factors such as the methods of impregnation and of removal of excess impregnating solution may be shown in the preparation of a muslin laminate. The muslin cloth is cut into strips about six feet long and six inches wide, washed in sulfonated soaps and rinsed in tap water to remove some of the size and dried. (This procedure causes a loss of 10 per cent of the original weight of the cloth.) The strips are soaked for 20 minutes at 65° C. in a solution of a commercial water-soluble melamine-formaldehyde condensation product (Melamac 502) in water containing an amount of butanol equal to 5 per cent of the water. After soaking 20 minutes in the solution, part of the strips are put through a wringer, part are washed in cold water and the rest are washed in hot water. The strips are air dried, cured by heating for 1 hour at 120° C., dipped in a 50 per cent acetone solution of a polyester binder of the class described hereinbefore containing diethylene glycol-maleate (75 parts), diallyl phthalate (25 parts) and benzoyl peroxide (5 parts), and air dried for 24 hours. The dried strips are stacked under 400 pounds per square inch pressure and cured for 20 minutes at 210° F. and then for 20 minutes at 300° F.

Table 8 shows the properties of test pieces cut from laminates so prepared, and more specifically describes the production of the laminates by specifying the per cent of melamine-formaldehyde condensation product in the impregnating solution (line 2), the method employed in removing the excess impregnating solution, i. e., wringing, washing with hot water or washing with cold water (line 3), the per cent of melamine-formaldehyde condensation product in the dried impregnated cloth (line 4) and the per cent of polyester binder in the laminate (line 5). The amount of water absorbed in the water absorption test is given in per cent by weight of the test piece for pieces immersed in cold water for 1 day (line 6), 4 days (line 7), 10 days (line 8) and 30 days (line 9). The compressive strength is given for test pieces which are dry (line 10), have been immersed in cold water for 1 day (line 11) and have been immersed in cold water for 10 days (line 12).

TABLE 8

| Sample No | 1 | 2 | 3 | 4 | 5 | 6 | 7 |
|---|---|---|---|---|---|---|---|
| Percent Cond. product in impregnating sol | 0 | 50 | 50 | 50 | 10 | 20 | 30 |
| Method of removing excess impregnating sol | | (1) | (2) | (3) | (3) | (3) | (3) |
| Percent Cond. product in dried cloth | | 8.7 | 10 | 34 | 7.2 | 19.5 | 27 |
| Percent Polyester in laminate | 51 | 55 | 53 | 40 | 53 | 47 | 48 |
| Percent Water absorp. in 1 day | 3.3 | 1.4 | 1.7 | 1.1 | 1.9 | 1.3 | 1.0 |
| Percent Water absorp. in 4 days | 6.0 | 2.6 | 3.2 | 2.2 | 3.2 | 2.3 | 1.7 |
| Percent Water absorp. in 10 days | 7.3 | 3.2 | 3.5 | 2.3 | 4.2 | 3.0 | 2.2 |
| Percent Water absorp. in 30 days | 8.1 | 4.4 | 4.8 | 3.2 | 5.0 | 3.7 | 2.7 |
| Compress. Strength (dry) | 15,200 | 19,000 | 17,800 | 20,600 | 18,500 | 19,200 | 21,200 |
| Compress. Strength (immersed for 1 day) | 14,300 | 18,600 | 18,300 | 20,300 | 17,700 | 19,500 | 22,000 |
| Compress. Strength (immersed for 10 days) | 11,700 | 17,600 | 16,300 | 18,900 | 14,800 | 16,900 | 19,800 |

1 Wash in cold water.
2 Wash in hot water.
3 Wring.

From Table 8 it can be seen that the control laminates absorb about 2 to 3 times as much water as the laminates of the invention during an equal period of immersion. The compressive strength of the laminates of the invention is as much as 33 per cent greater than that of the control laminates when dry and as much as 70 per cent greater after immersion for 10 days. About 25 per cent melamine-formaldehyde condensation product in the filler appears to be the optimum at which the best all-around properties are obtained.

Also it can be seen that the different methods of removing the excess impregnating solution from the cloth cause considerable variation in the per cent of melamine-formaldehyde condensation product left in the cloth and to a certain extent cause other unexplained variations in the water absorption and compressive strength. For example, the cloth samples subjected to a 50 per cent solution impregnation and subsequent rinsing in cold water (line 4, Table 8), those subjected to a 50 per cent solution impregnation and subsequent hot water rinsing (line 5, Table 8) and those subjected to a 10 per cent solution impregnation and subsequent wringing out (line 6, Table 8) have a nearly equal amount of the condensation product left in the cloth, but the cloth subjected to the cold water rinse produces a laminate which has noticeably better water resistance and compressive strength. Although the reason for this is not understood completely, it is believed that a procedure such as the cold water rinse has the effect of leaving the condensation product mainly inside the fibers and that such effect is responsible in part for the superior properties of the laminate.

The appearance of the laminates of the invention after immersion for 10 days is apparently unchanged in that they do not show any appreciable swelling, but the control laminates show a noticeable swelling and a breaking away of the polyester from the surface of the cloth. Also, laminates of the invention are less sensitive to high temperatures in that they do not tend to yellow at 300° F. as do the control laminates, and are much less affected by cigarette burns than are the control laminates.

Example 1

A solution of 2 mols of urea in formalin (37 per cent aqueous formaldehyde solution) containing 3 mols of formaldehyde is held at 30° C. and at a pH of about 7 for 6 hours. An amount of alpha cellulose fluff equal to the weight of urea is completely impregnated by mixing it in an egg beater type mixer with the solution of the urea-formaldehyde condensation product diluted with sufficient water so that the weight of the diluted solution is from 2 to 3 times the weight of the cellulosic filler. The impregnated filler is thoroughly dried and then ground with 1 per cent of its weight of maleic anhydride and is held at 212° F. for two days. Then the impregnated filler, about half its weight of a polymerizable polyester prepared as described hereinbefore and an amount of zinc stearate equal to about 2 per cent of the composition are milled for 10 to 12 minutes on a heated 2-roll (differential speed) rubber mill at the lowest temperature at which a homogenous mass can be obtained. The resulting composition is removed in sheets, is allowed to solidify fully while at about 80 to 90° F. and is granulated in a high speed cutter to a maximum particle diameter of about ⅛ inch. The granulated composition is compression molded at a temperature equivalent to 65 to 70 pounds gauge pressure of steam for 1 to 5 minutes. The composition is fast curing and gives moldings free from gas which have excellent strength and water resistance.

Example 2

A procedure is carried out that is the same as that given in Example 1 except that 100 parts of the cellulosic filler is impregnated with 125 parts of a hot 20% solution of a condensation product obtained by holding a solution of 1 mol of melamine in formalin containing 3 mols of formaldehyde at 80° C. for 10 minutes at a pH of 7. The resulting composition is fast curing and gives moldings free from gas which have substantially greater strength and water resistance than those of Example 1.

Example 3

A procedure is carried out that is the same as that given in Example 1 except that 100 parts of the cellulosic filler is impregnated with 250 parts of a solution of 1 mol of adipoguanamine and an amount of formalin containing 5 mols of formaldehyde in sufficient methyl Cellosolve to give a 10% solution of the condensation product, which has been held at 100° C. for 20 minutes at a pH of 7. The resulting composition is fast curing and gives moldings free from gas whose strength and water resistance are very high, but not as high as in the case of the molded articles of Example 2.

Example 4

A procedure is carried out that is the same as that given in Example 1 except that 100 parts of the cellulosic filler is impregnated with 250 parts of a freshly prepared solution obtained by dissolving 1 mol of guanazole in sufficient water to give a 10% solution of the reaction product, adding formalin containing 2 mols of formaldehyde and adjusting the pH to 7. The resulting composition is fast curing and gives moldings whose properties are substantially the same as those of the moldings of Example 1.

*Example 5*

A procedure is carried out that is the same as that given in Example 1 except that 100 parts of the cellulosic filler is impregnated with 125 parts of a 20% solution of a condensation product obtained by holding a solution of 1 mol of propylene diurea in formalin containing 2 mols of formaldehyde at 80° C. for 10 minutes at a pH of 7. The resulting composition is fast curing and gives moldings whose properties are substantially the same as those of the moldings of Example 1.

*Example 6*

Strips of cellulosic cloth or paper laminating material are impregnated with 20 per cent of their weight of a condensation product, using an impregnating solution prepared as described in any of the previous examples. Any excess condensation product in the strips is removed by putting the strips through a wringer or by washing them in hot or in cold water. The strips are air dried and the condensation product then is converted to the substantially infusible state by heating to 250° F. for 10 minutes. The dried impregnated strips are immersed in a 50 per cent acetone solution of a polyester binder prepared as described hereinbefore. The strips are dried in a circulating oven at room temperature for 24 hours, stacked to form the desired number of plies, and cured under 400 pounds per square inch pressure for 20 minutes at 210° F. and then for 20 minutes at 300° F. The resulting laminates are free from gas and have excellent strength and water resistance.

Having described the invention, I claim:

1. A material which upon polymerization has improved strength and water resistance, comprising 100 parts of a polymerizable olefinically unsaturated polyhydric alcohol-polycarboxylic acid polyester and from 1 to 400 parts of a material consisting substantially of finely divided cellulose impregnated with from $\frac{1}{200}$ to 10 times its weight of an infusible reaction product of formaldehyde and a substance of the class consisting of urea and melamine.

2. A material as claimed in claim 1 in which the substance is melamine.

3. A material of improved strength and water resistance, comprising the product of the polymerization of a material claimed in claim 1.

4. A material of improved strength and water resistance, comprising the product of the polymerization of a material claimed in claim 1 in which the substance is melamine.

5. A method of producing a material of improved strength and water resistance that comprises carrying out polymerization of 100 parts of a polymerizable olefinically unsaturated polyhydric alcohol-polycarboxylic acid polyester in the presence of from 1 to 400 parts of a material consisting substantially of finely divided cellulose impregnated with from $\frac{1}{200}$ to ten times its weight of an infusible reaction product of formaldehyde and a substance of the class consisting of urea and melamine.

6. A method of producing a material which upon polymerization has improved strength and water resistance that comprises impregnating material consisting substantially of finely divided cellulose with from $\frac{1}{200}$ to ten times its weight of a thermosetting reaction product of formaldehyde and a substance of the class consisting of urea and melamine, converting the reaction product to its infusible state, and then impregnating from 1 to 400 parts of the material with 100 parts of a polymerizable olefinically unsaturated polyhydric alcohol-polycarboxylic acid polyester.

7. A process which comprises uniformly impregnating a finely divided natural cellulosic filler with a 1% to 20% aqueous solution of a methylol urea from the class consisting of monomethylol urea, dimethylol urea and mixtures of monomethylol urea and dimethylolurea, retaining an amount of said solution equivalent to 5% to 15% of methylol urea based on the weight of said filler, thoroughly drying said impregnated filler, converting said methylol urea to the infusible stage, then incorporating the resultant impregnated cellulose filler in a copolymerizable mixture of styrene and an olefinically unsaturated, vulcanizable, linear alkyd resin and finally molding and vulcanizing the mixture of styrene and said alkyd resin containing said impregnated filler.

8. A process which comprises uniformly impregnating a finely divided natural cellulosic filler with a 1% to 20% aqueous solution of a methylol urea from the class consisting of monomethylol urea, dimethylol urea and mixtures of monomethylol urea and dimethylolurea, retaining an amount of said solution equivalent to 10% of methylol urea based on the weight of said filler, thoroughly drying said impregnated filler, converting said methylol urea to the infusible stage, then incorporating the resultant impregnated cellulose filler in a copolymerizable mixture of an olefinically unsaturated, vulcanizable, linear alkyd resin and a polymerizable olefinically unsaturated monomeric compound compatible therewith, and finally molding and vulcanizing said copolymerizable mixture containing said impregnated filler.

9. A process which comprises uniformly impregnating a finely divided natural cellulosic filler with a 1% to 20% aqueous solution of a methylol urea from the class consisting of monomethylol urea, dimethylol urea and mixtures of monomethylol urea and dimethylolurea, retaining an amount of said solution equivalent to 5% to 15% of methylol urea based on the weight of said filler, thoroughly drying said impregnated filler, converting said methylol urea to the infusible stage, then incorporating the resultant impregnated cellulose filler in a copolymerizable mixture of an olefinically unsaturated, vulcanizable, linear alkyd resin and a polymerizable olefinically unsaturated monomeric compound compatible therewith, and finally molding and vulcanizing said copolymerizable mixture containing said impregnated filler.

10. A process which comprises uniformly impregnating a finely divided natural cellulosic filler with a 1% to 20% aqueous solution of a methylol urea from the class consisting of monomethylol urea, dimethylol urea and mixtures of monomethylol urea and dimethylolurea, retaining an amount of said solution equivalent to 10% of methylol urea based on the weight of said filler, thoroughly drying said impregnated filler, converting said methylol urea to the infusible, stage, then incorporating the resultant impregnated cellulose filler in a copolymerizable mixture of styrene and an olefinically unsaturated, vulcanizable, linear alkyd resin and finally molding and vulcanizing the mixture of styrene and said alkyd resin containing said impregnated filler.

ARTHUR M. HOWALD.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,255,313 | Ellis | Sept. 9, 1941 |
| 2,288,279 | Hopff | June 30, 1942 |
| 2,368,451 | D'Alelio | Jan. 30, 1945 |

FOREIGN PATENTS

| Number | Country | Date |
| --- | --- | --- |
| 412,373 | Canada | May 11, 1945 |

OTHER REFERENCES

Modern Plastics Encyclopedia (1946), pages 158–159, 338–343.